(12) United States Patent
Nakagawa et al.

(10) Patent No.: US 8,810,756 B2
(45) Date of Patent: Aug. 19, 2014

(54) LIQUID CRYSTAL DISPLAY PANEL

(75) Inventors: Teruhisa Nakagawa, Chiba (JP); Yoshinori Aono, Ibaraki (JP); Kentaro Ojima, Chiba (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 167 days.

(21) Appl. No.: 13/549,231

(22) Filed: Jul. 13, 2012

(65) Prior Publication Data

US 2013/0016315 A1    Jan. 17, 2013

(30) Foreign Application Priority Data

Jul. 13, 2011   (JP) ................................. 2011-155133

(51) Int. Cl.
*G02F 1/1335*    (2006.01)
*G02F 1/1333*    (2006.01)

(52) U.S. Cl.
CPC ...... *G02F 1/133514* (2013.01); *G02F 2201/52* (2013.01)
USPC .......................................... 349/108; 349/110

(58) Field of Classification Search
USPC .................................................. 349/108, 110
See application file for complete search history.

(56) References Cited

U.S. PATENT DOCUMENTS

| | | | |
|---|---|---|---|
| 5,248,576 A * | 9/1993 | Yokoyama et al. ................ | 430/7 |
| 2006/0203155 A1 * | 9/2006 | Nakamura et al. ............. | 349/114 |
| 2006/0274235 A1 * | 12/2006 | Takizawa ...................... | 349/108 |

FOREIGN PATENT DOCUMENTS

JP    11-295717 A    10/1999

* cited by examiner

*Primary Examiner* — Phu Vu
(74) *Attorney, Agent, or Firm* — McDermott Will & Emery LLP

(57) ABSTRACT

A color filter layer includes a first filter, a second filter, and a third filter of different colors. Further, the color filter layer includes a fourth filter of a color same as that of one of the three filters, and a black matrix partitioning the four filters. A hole is formed on the fourth filter. The hole extends in the direction along the first line portion of the black matrix, and the first line portion forms a part of the edge of the hole. With this structure, it is possible to prevent variation in the area ratio of a hole formed in the fourth sub-pixel for improving brightness in a liquid crystal display panel.

7 Claims, 6 Drawing Sheets

LIQUID CRYSTAL DISPLAY PANEL

CROSS-REFERENCE TO RELATED APPLICATION

The present application claims priority from Japanese application JP2011-155133 filed on Jul. 13, 2011, the content of which is hereby incorporated by reference into this application.

TECHNICAL FIELD

The present application relates to a technique for improving brightness of a liquid crystal display panel.

BACKGROUND

In order to improve brightness of liquid crystal display panels, a liquid crystal display panel has been developed to include a white sub-pixel in addition to red, green, and blue sub-pixels. In a liquid crystal display panel disclosed in Japanese Patent Laid-open Publication No. 1999-295717, a white color filter is formed on a white sub-pixel.

SUMMARY

The structure disclosed in the Patent Document mentioned above increases the costs and manufacturing steps due to use of a white color filter. In view of the problem, a structure has been studied in which a color filter of the same color as one of the three other color filters is formed on a sub-pixel corresponding to the white sub-pixel and plural holes are formed on the color filter. According to such a structure, the brightness can be improved as a result of the light passing through the hole, while reducing costs. Further, an overcoat layer for covering the color filter is filled in the hole formed on the color filter. And thus, the thickness of the liquid crystal layer can be prevented from increasing due to the hole. As a result, decrease in the response speed of the liquid crystal layer can be prevented.

The hole on the color filter is formed in processing such as etching. The shape of an edge of the hole formed in such processing may likely be resulted in different from what is intended. That is, the size of the hole may likely be resulted in different from the intended size. Therefore, the area ratio of the hole in the sub-pixel (a ratio of an area free from a black matrix and a color filter) may likely vary.

Preferred embodiments of the present application provide a liquid crystal display panel capable of preventing variation in the area ratio of the hole in the sub-pixel for improving brightness.

In one general aspect, the instant application describes a liquid crystal display panel which includes four sub-pixels in each pixel and a color filter layer. The color filter layer includes a first color filter, a second color filter, and a third color filter which are different from each other in color and respectively provided at three sub-pixels of the four sub-pixels The fourth color filter is substantially of the same color as one of the three color filters and provided at a remaining one sub-pixel of the four sub-pixels. A black matrix partitions the four color filters and includes a first line portion which partitions the fourth color filter and a color filter adjacent to the fourth color filter. The fourth color filter has at least one hole formed thereon. The at least one hole extends in a direction along the first line portion of the black matrix. The first line portion forms apart of an edge of the at least one hole. Since the first line portion of the black matrix forms a part of the edge of the hole, the variation in the size of the hole can be prevented, and thus variation in the area ratio of the hole in the sub-pixel for improving rightness can be prevented.

The above general aspect may include one or more of the following features. The liquid crystal display panel may further include a substrate where gate electrode lines which receive a scan signal and drain electrode lines which receive a video signal are formed in a matrix. The first line portion of the black matrix is formed along the drain electrode line. The first line portion formed along the drain electrode line is longer, compared to the line portion formed along the gate electrode line. Thus, according to the above structure, it is possible to increase the percentage of a part of the edge of a hole, where the part is formed by the black matrix.

The black matrix may further include a second line portion formed along the gate electrode line. The at least one hole has an end in an extension direction of the drain electrode line. The end is positioned apart from the second line portion. According to this structure, even when the liquid crystal layer in the vicinity of the gate electrode line does not attain sufficient light shielding function, transmission of light can be prevented by the fourth color filter.

The fourth color filter may have, as the at least one hole, a plurality of holes formed thereon positioned apart from each other in an extension direction of the gate electrode line. According to this structure, it is possible to increase the area ratio of the holes in the sub-pixel.

The fourth color filter may have, as the at least one hole, two holes formed thereon, the black matrix has two first line portions each serving as the first line portion and positioned on opposite sides from each other across the fourth color filter, and the two holes are respectively formed along the two first line portions. According to this structure, it is possible to prevent variation in the area ratio, while increasing the area ratio of the holes in the sub-pixel.

The black matrix may be thicker than the fourth color filter, and the color filter layer may has an overcoat layer formed thereon. According to this structure, it is possible to prevent increase of the thickness of the liquid crystal layer due to the hole.

The four sub-pixels may have a V-shape in a plan view. The first line portion may be bent partway into a V-shape in conformity with a shape of the remaining one sub-pixel. The at least one hole may be bent in conformity with the first line portion. According to this structure, it is possible to reduce variation in the size of the hole, while reducing wavelength dependency due to a viewing angle.

DETAILED DESCRIPTION

Figure 1:
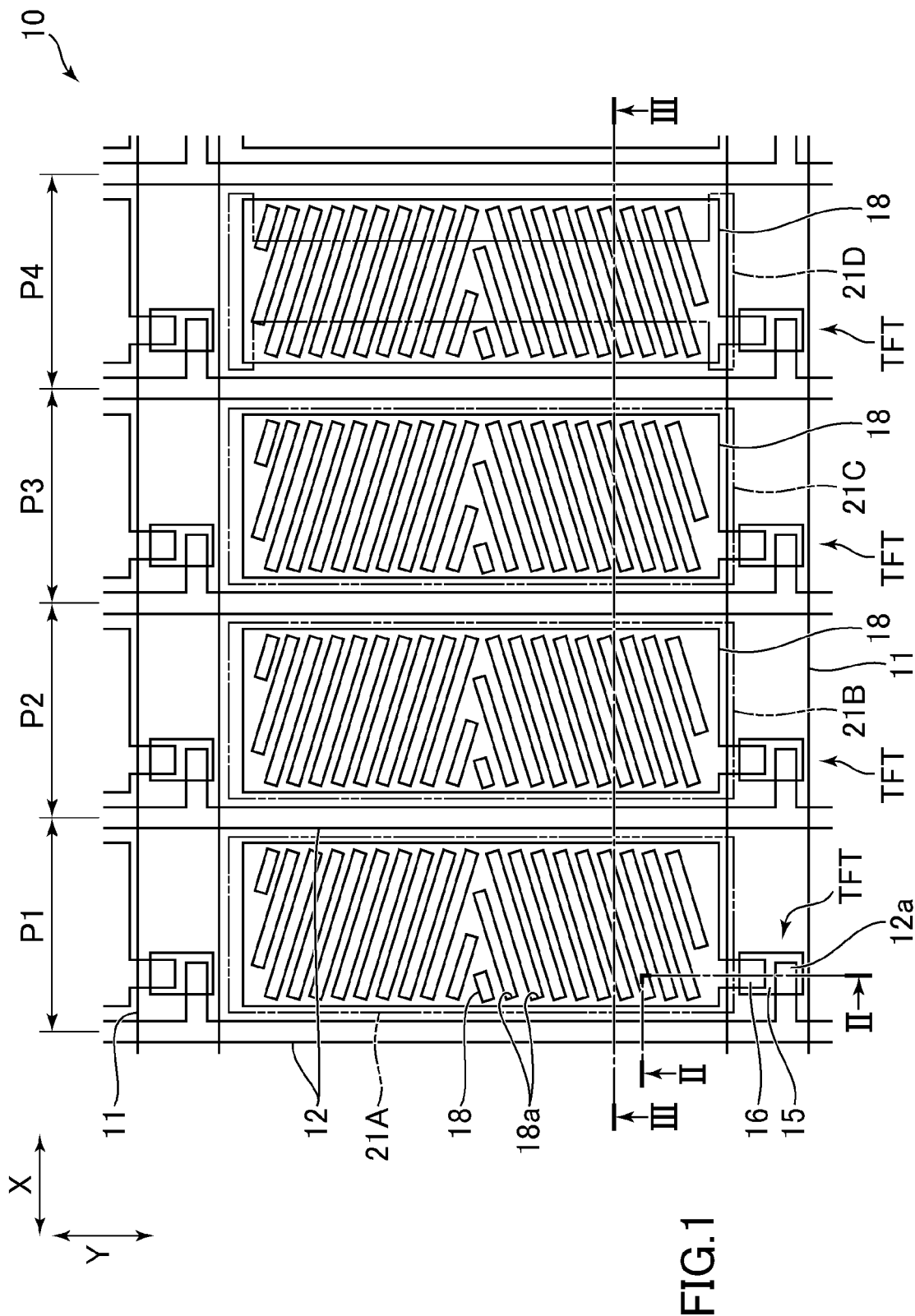
FIG. 1 is a plan view of a TFT substrate constituting a liquid crystal panel according to an embodiment of the present implementation.
Figure 2:
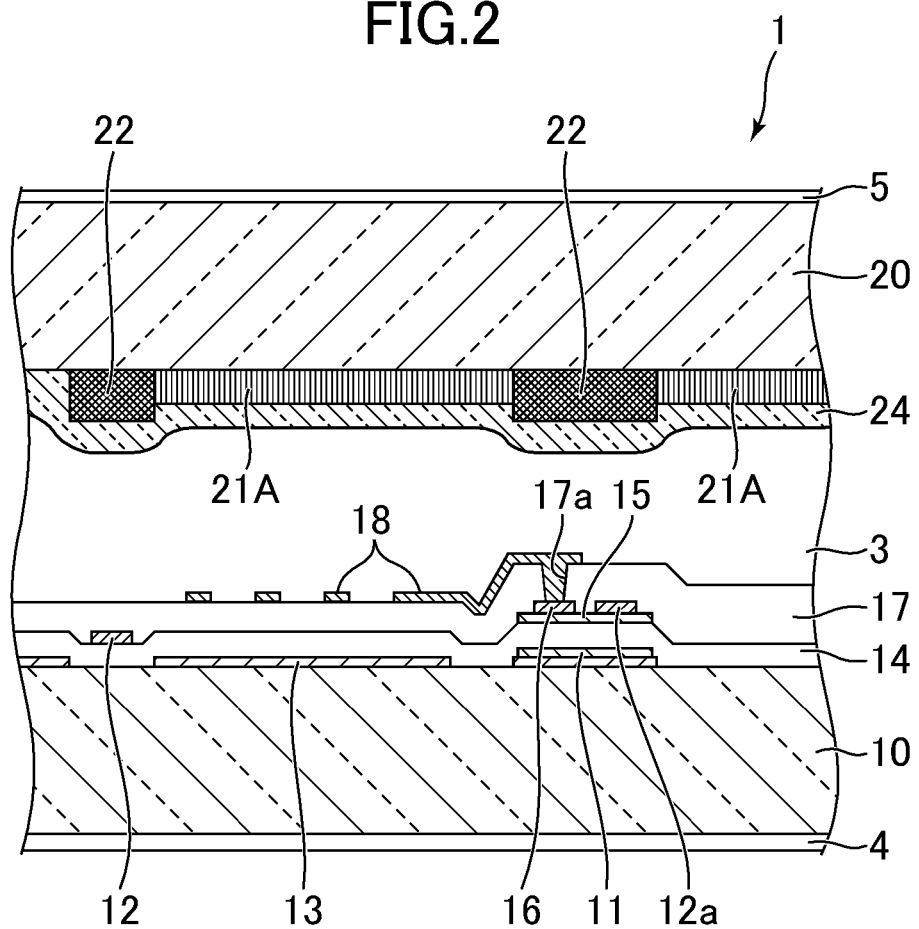
FIG. 2 is a cross sectional view of the liquid crystal display panel along the line II-II in FIG. 1 as a section.
Figure 3:
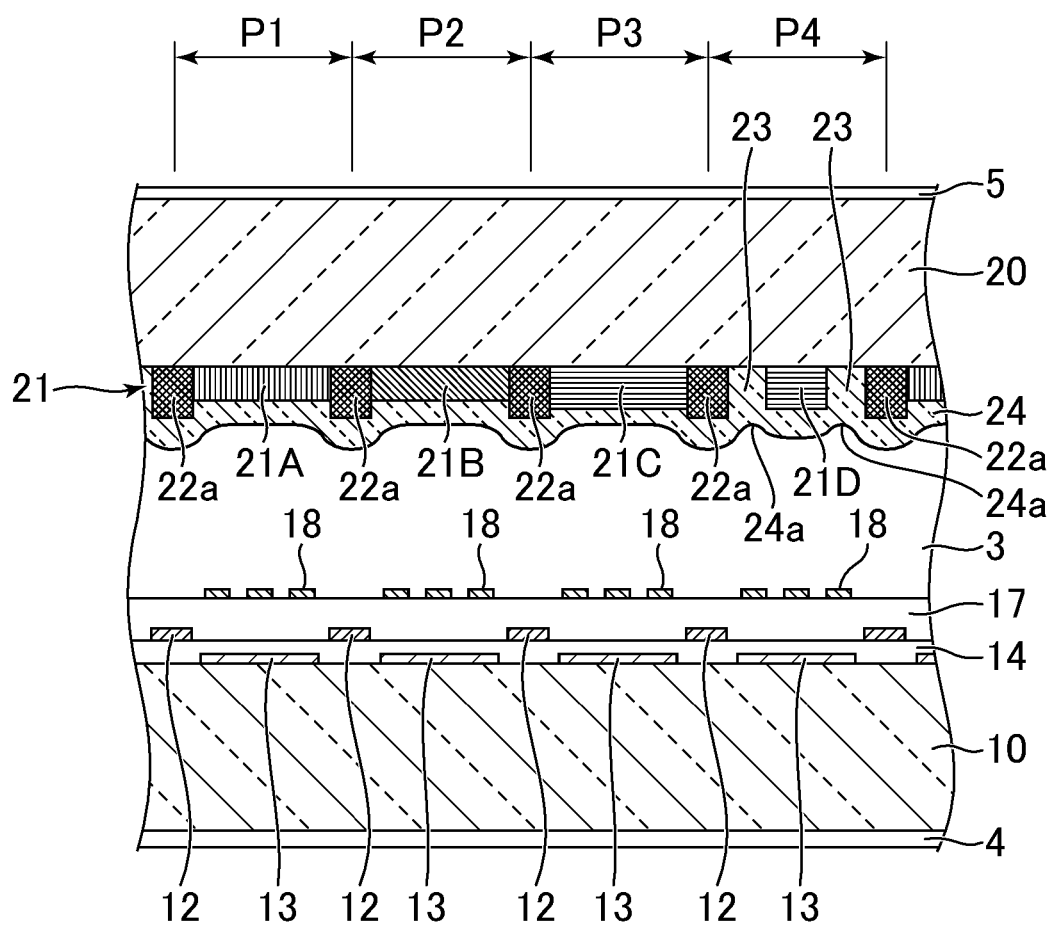
FIG. 3 is a cross sectional view of the liquid crystal display panel along the line III-III in FIG. 1 as a section.
Figure 4:
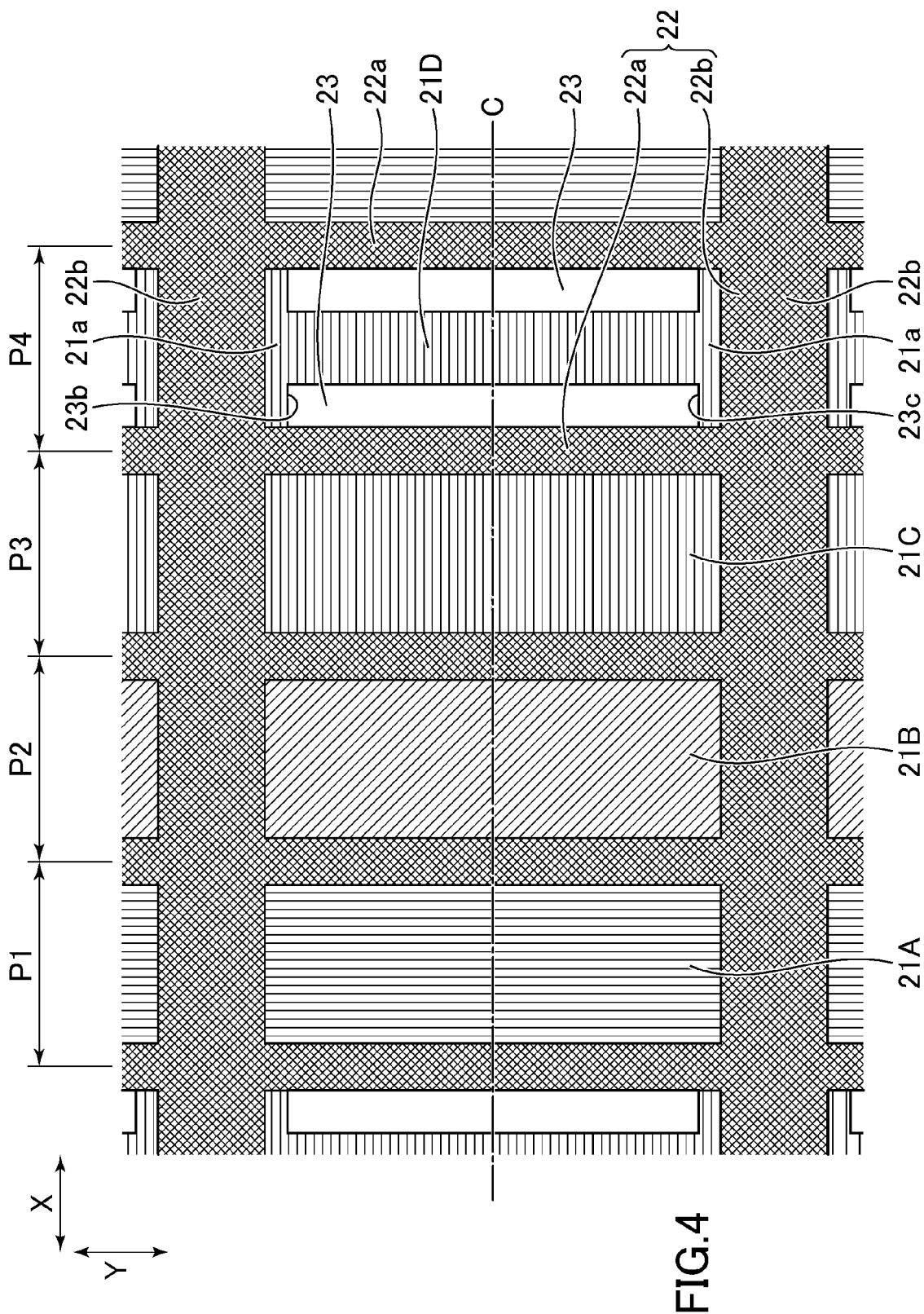
FIG. 4 is a plan view of a color filter substrate constituting the liquid crystal display panel.

In the following, an embodiment of the present implementation will be described with reference to the accompanying drawings. FIG. 1 is a plan view of a TFT substrate 10 constituting a liquid crystal panel 1 according to an embodiment of the present implementation. FIG. 2 is a cross sectional view of the liquid crystal display panel 1 along the line II-II in FIG. 1 as a section. FIG. 3 is a cross sectional view of the liquid crystal display panel 1 along the line III-III in FIG. 1 as a section. FIG. 4 is a plan view of a color filter substrate 20 constituting the liquid crystal display panel 1.

As shown in FIG. 2, the liquid crystal display panel 1 includes a TFT substrate 10 and a color filter substrate 20 facing each other. Each of the TFT substrate 10 and the color filter substrate 20 is a transparent substrate (for example, a glass substrate). A liquid crystal layer 3 is provided between the TFT substrate 10 and the color filter substrate 20. The TFT substrate 10 includes a surface facing toward the opposite side from the liquid crystal layer 3 and attached with a polarizer 4. The color filter substrate 20 includes a surface facing toward the opposite side from the liquid crystal layer 3 and attached with a polarizer 5.

As shown in FIG. 1, in the liquid crystal display panel 1, four sub-pixels P1, P2, P3, P4 are defined in each pixel. As shown in FIGS. 1 and 2, a thin film transistor (TFT) that functions as a switch to drive the liquid crystal is formed on the TFT substrate 10. Each sub-pixel is provided with the TFT.

As shown in FIG. 1, the TFT substrate 10 has a plurality of gate electrode lines 11 formed thereon which receives a scan signal for turning on/off the TFT. Further, the TFT substrate 10 has a plurality of drain electrode lines 12 formed thereon which receives a video signal representing a gradation value of each sub-pixel. The gate electrode line 11 and the drain electrode line 12 are formed in a matrix.

The liquid crystal display panel 1 in this example employs the IPS (In Plane Switching). And thus, a common electrode 13 and a pixel electrode 18 facing the common electrode 13 are formed in each sub-pixel of the TFT substrate 10, as shown in FIG. 2. The common electrode 13 and the pixel electrode 18 are made of a transparent electric conductive film, such as an ITO (Indium Tin Oxide).

In the liquid crystal display panel 1, the common electrode 13 is formed on the TFT substrate 10 together with the gate electrode line 11. Further, a gate insulating film 14 is formed on and covering the common electrode 13 and the gate electrode line 11. A transparent electric conductive film similar to the common electrode 13 is formed between the gate electrode line 11 and the TFT substrate 10. As shown in FIG. 2, the drain electrode line 12 and a semiconductor layer 15, such as amorphous silicon, a microcrystal silicon, or the like, are formed on the gate insulating film 14. The semiconductor layer 15 is positioned above the gate electrode line 11 (see FIGS. 1 and 2). A source electrode 16 and a drain electrode 12a are formed on the semiconductor layer 15, in which the drain electrode 12a extends from the drain electrode line 12 to the semiconductor layer 15. A protective insulating film 17 made of a semiconductor oxide, such as $SiO_2$ or a nitride semiconductor, such as SiN, is formed on and covering the drain electrode line 12, the source electrode 16, and the semiconductor layer 15. The pixel electrode 18 is formed on the protective insulating film 17, and connected to the source electrode 16 through a through hole 17a formed in the protective insulating film 17. As shown in FIGS. 1 and 2, a plurality of slits 18a are formed in the pixel electrode 18. Specifically, in this example, the slit 18a extends from one drain electrode line 12 to the other drain electrode line 12 diagonally relative to the gate electrode line 11, as shown in FIG. 1. In this specification, the electrode line 12, which is formed in a matrix together with the gate electrode line 11, is referred to as a drain electrode line. However, the electrode line 12 may be referred to as a source electrode line. In the latter case, the electrode 12a is referred as a source electrode, and the electrode 16 is referred as a drain electrode.

The structure of the TFT substrate 10 is not limited the described above. For example, a second common electrode which covers the drain electrode line 12 and has the same electric potential as the common electrode 13 may be formed on the protective insulating film 17 in addition to the pixel electrode 18. With the above described second common electrode, an unnecessary electric field due to a signal being transmitted in the drain electrode line 12 can be prevented from occurring in the liquid crystal layer 3. Further, the pixel electrode 18 may be formed on the TFT substrate 10 together with the gate electrode line 11, while the common electrode 13 may be formed on the side of the protective insulating film 17 toward the liquid crystal layer 3. Although the liquid crystal display panel 1 in the above description employs the IPS, the present implementation may be applied to any other drive system, such as VA (Vertical Alignment).

As described above, the liquid crystal display panel 1 includes a color filter substrate 20 provided opposite to the TFT substrate 10. As shown in FIGS. 3 and 4, a color filter layer 21 is formed on the color filter substrate 20, specifically, formed on the surface of the color filter substrate 20 toward the liquid crystal layer 3. The color filter layer 21 includes three color filters which is different in color. That is, the color filter layer 21 includes a first filter 21A, a second filter 21B, and a third filter 21C. The first filter 21A, the second filter 21B, and the third filter 21C are red, green, and blue filters, respectively. As described above, four sub-pixels P1, P2, P3, P4 are defined in each pixel. The first filter 21A, the second filter 21B, and the third filter 21C are respectively formed in the three sub-pixels P1, P2, P3 of the four sub-pixels P1, P2, P3, P4. Any material such as dye, pigment, and so forth may be used for the filters 21A, 21B, 21C.

The color filter layer 21 includes a fourth filter 21D at the position of the remaining sub-pixel P4, as shown in FIGS. 3 and 4. The fourth filter 21D is the same color as one of the three filters 21A, 21B, 21C. In this example, the fourth filter 21D is the same color as the third filter 21C which is made of a blue color material. Therefore, the fourth filter 21D can be made in the process for forming the third filter 21C.

In this example, as shown in FIG. 4, the sub-pixels P1, P2, P3, P4 are aligned in a stripe arrangement. That is, the sub-pixels P1, P2, P3, P4 are aligned in one direction (an extension direction of the gate electrode line 11). The sub-pixel P4 on which the fourth filter 21D is a sub-pixel positioned at an end of each pixel.

The color filter layer 21 further includes a black matrix 22 partitioning the four filters 21A, 21B, 21C, 21D. For example, the black matrix 22 is made of a metal chromium, resin black including carbon or titan, metallic material such as nickel, or the like. As shown in FIG. 4, the black matrix 22 includes a plurality of first line portions 22a partitioning two adjacent sub-pixels. In other words, the first line portion 22a partitions two adjacent filters. In this example, the plurality of first line portions 22a is respectively formed along the plurality of drain electrode lines 12, separating the filters 21A, 21B, 21C, 21D aligned in the extension direction of the gate electrode line 11 (see FIG. 3). The black matrix 22 further includes a plurality of second line portions 22b that intersect the plurality of first line portions 22a to define a matrix. The plurality of second line portions 22b is respectively formed along the plurality of gate electrode lines 11. The second line portion 22b separates the filters 21A, 21B, 21C, 21D aligned in the extension direction of the drain electrode line 12.

As shown in FIGS. 3 and 4, the fourth filter 21D has a hole 23 formed therein which is formed like a slit and penetrates the fourth filter 21D in the thickness direction thereof. The hole 23 extends in the direction along the first line portion 22a. The hole 23 is formed adjacent to the first line portion 22a of the black matrix 22 such that the first line portion 22a forms a part of the edge of the hole 23. In this example, the entire edge of the hole 23 toward the first line portion 22a is formed by the first line portion 22a. In the manufacturing process, the black matrix can be formed to have a higher accuracy in its line width than the shape of a filter. Therefore, according to the above described structure in which the first line portion 22a serves as the edge of the hole 23, variation in the size of the hole 23 can be prevented, compared to a structure in which the hole 23 is formed at a position apart from the first line portion 22a and the second line portion 22b.

The fourth filter 21D is of the same color as that of the third filter 21C, as described above. That is, in this example, these filters 21D, 21C are blue color filters. A blue color filter has a lower light transmittivity, compared to those of the filters of the other two colors. Therefore, an influence of the fourth filter 21D on an image can be reduced.

As shown in FIG. 3, an overcoat layer 24 is formed on the color filter layer 21. That is, the surface of the color filter layer 21 toward the liquid crystal layer 3 is coated with the overcoat layer 24. The overcoat material of the overcoat layer 24 is filled inside the hole 12. Thus the depth of a concave portion 24a on the overcoat layer 24, which is formed at the position of the hole 23 can be reduced, compared to a structure in which the entire sub-pixel P4 is open, that is, a structure in which the fourth filter 21D is not provided at all. Consequently, it is possible to prevent decrease in the response speed of the liquid crystal layer 3.

As described above, the first line portion 22a is formed along the drain electrode line 12. In the liquid crystal display panel where sub-pixels are aligned in stripe arrangement, since each sub-pixel is elongated in the direction along the drain electrode line 12, the first line portion 22a is longer than the second line portion 22b, as shown in FIG. 4. Therefore, with the arrangement in which the first line portion 22a serves as a part of the edge of the hole 23, the part of the edge of the hole 23 can be readily increased.

In the liquid crystal display panel 1 in this example, as shown in FIG. 4, each of the sub-pixels P1, P2, P3, P4 is rectangular, and the first line portion 22a and the drain electrode line 12 are formed linear. The hole 23 extends linear along the first line portion 22a, being subsequently rectangular.

As shown in FIG. 4, one end portion 23b of the hole 23 and the other end portion 23c are positioned on the opposite sides from each other across the center line C of the sub-pixel in the extension direction of the drain electrode line 12. The hole 23 is a single hole that is continuous from one end portion 23b to the other end portion 23c. That is, formed along one first line portion 22a is only one hole 23, and the hole 23 extends from one end portion 23b to the other end portion 23c. This structure can further increase the percentage of the part of the edge of the hole 23 that is constituted by the black matrix 22, compared to a structure in which the hole 23 is discontinued in the extension direction of the drain electrode line 12.

Plural holes 23 (two holes 23 in this example) are formed in the fourth filter 21D, being positioned apart from each other in the extension direction of the gate electrode line 11 (the X direction in FIG. 4). This structure can increase the area ratio of the holes 23 in the sub-pixel P4. The two holes 23 are respectively formed along two first line portions 22a that are positioned on the opposite sides from each other across the fourth filter 21D. Then, the two first line portions 22a respectively serve as parts of the edges of the two holes 23.

As shown in FIG. 4, the two holes 23 have the same shape and are formed in parallel to each other. The hole 23 in this example is an elongated rectangular hole that is long in the direction along the first line portion 22a, as described above. Therefore, the width of the fourth filter 21D between the two holes 23 is substantially constant in the extension direction of the drain electrode line 12 (the Y direction in FIG. 4). Consequently, a wider width of the hole 23 can be readily ensured. Further, since the hole 23 is rectangular, the area of the hole 23 can be readily ensured.

As shown in FIG. 4, the end portions 23b, 23c of the hole 23 are positioned apart from the second line portion 22b of the black matrix 22. That is, the end portion 21a of the fourth filter 21D is formed between the end portion 23b, 23c of the hole 23 and the second line portion 22b. The end portion 21a of the fourth filter 21D is formed along the second line portion 22b. Further, the end portion 21a of the fourth filter 21D is continuous from one first line portion 22a to the other first line portion 22a positioned on the opposite side. Therefore, even when the liquid crystal layer 3 positioned in the vicinity of the gate electrode line 11 does not attain sufficient light shielding function at black display, light transmission can be prevented by the fourth filter 21D.

As described above, the overcoat layer 24 is formed on the color filter layer 21. As shown in FIG. 3, the black matrix 22 is thicker than the fourth filter 21D. In this example, the black matrix 22 is thicker than the other three filters 21A, 21B, 21C as well, and thus projects more toward the liquid crystal layer 3 than the filters 21A, 21B, 21C, 21D do. This structure can further reduce the depth of the concave portion 24a on the overcoat layer 24 and prevent decrease of the response speed of the liquid crystal layer 3 in the sub-pixel P4.

Further, in this example, the fourth filter 21D is thicker than the filters 21A, 21B. Therefore, the response speed of the liquid crystal layer 3 in the sub-pixel P4 can be effectively prevented from decreasing due to the concave portion 24a. As described above, since the fourth filter 21D is made in the same process as a process where the third filter 21C is made, the fourth filter 21D has the same thickness as that of the third filter 21C.

Figure 5:
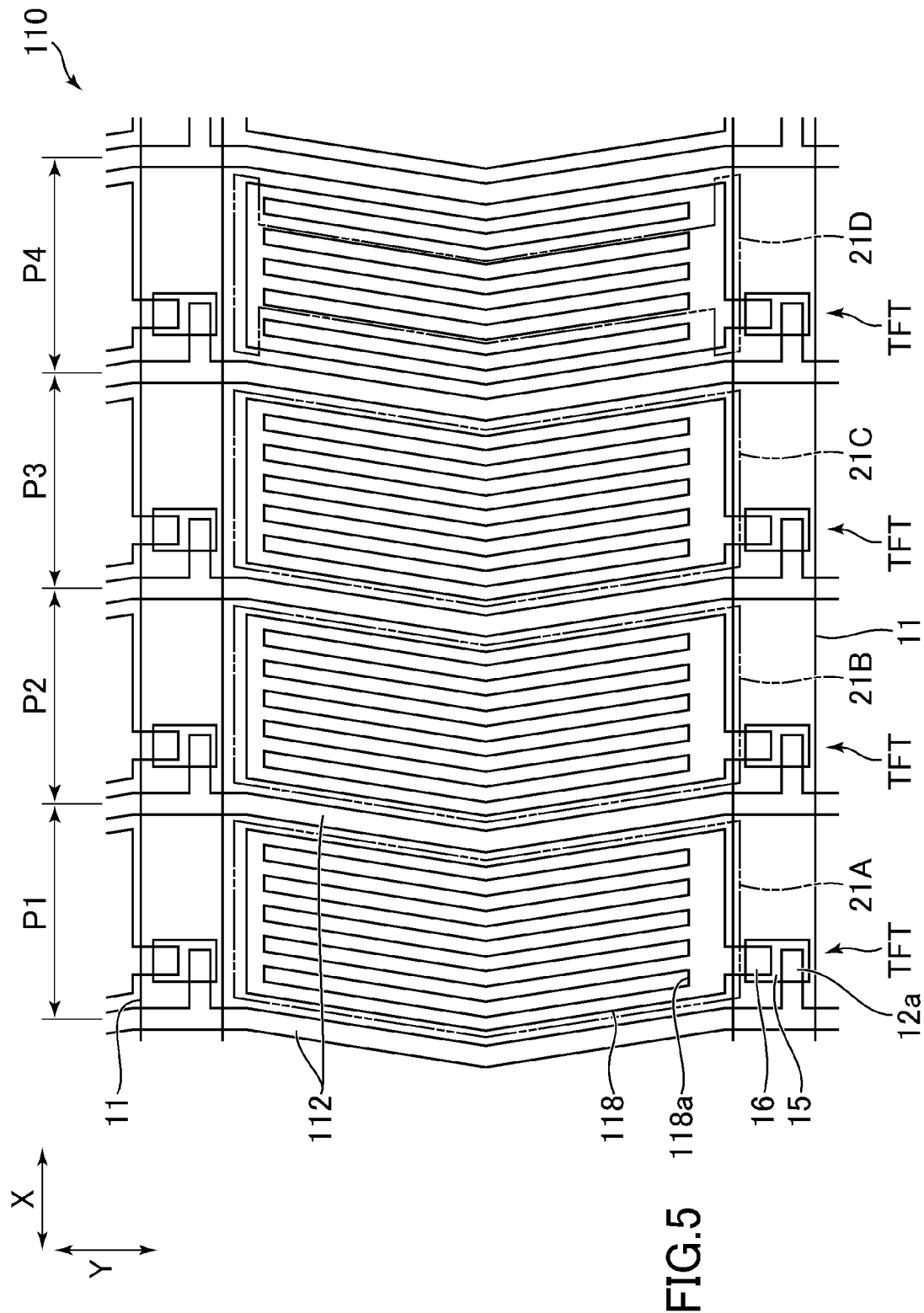
FIG. 5 is a plan view of a TFT substrate constituting a liquid crystal display panel according to another embodiment of the present implementation.
Figure 6:
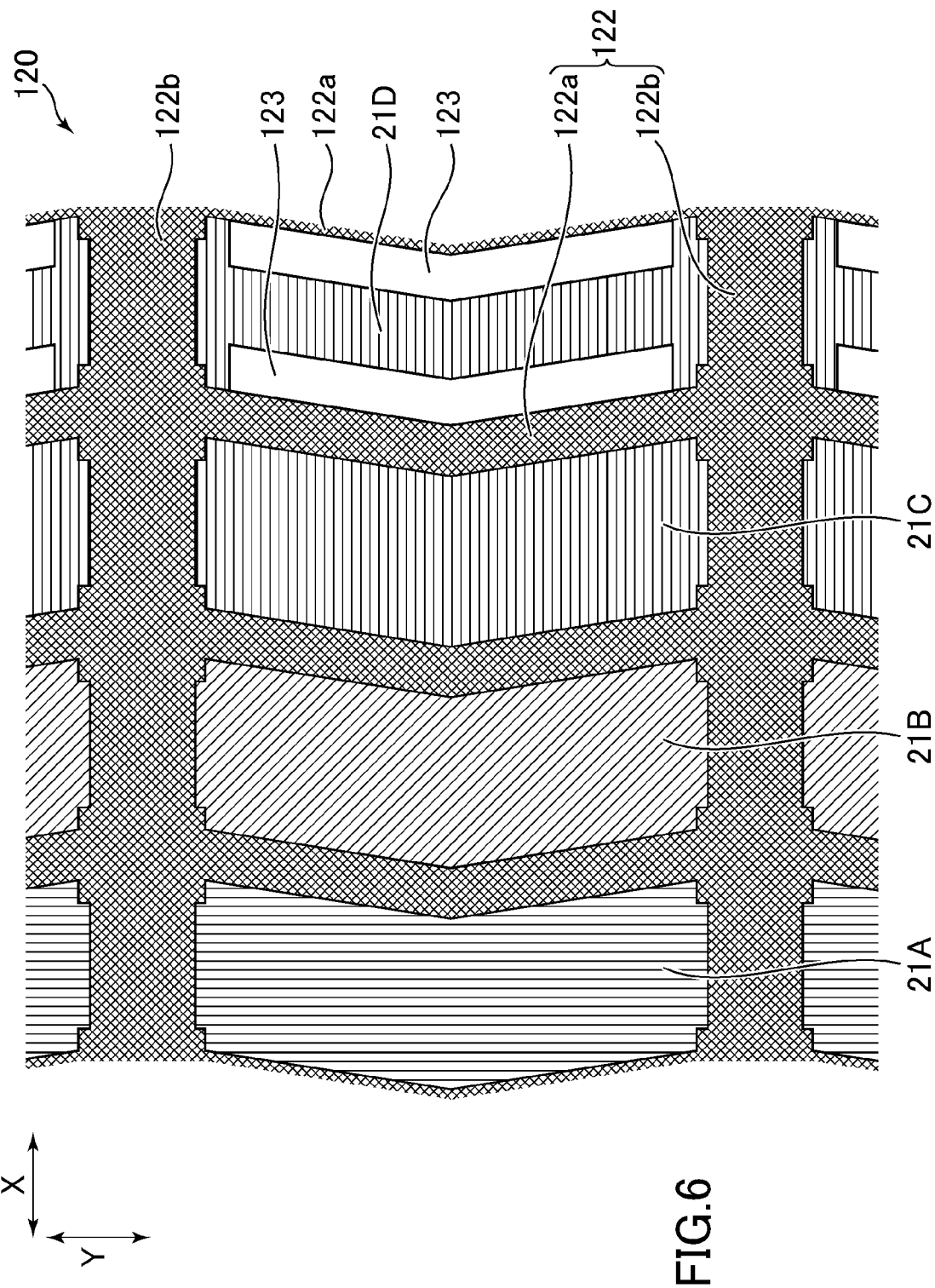
FIG. 6 is a plan view of a color filter substrate included in the liquid crystal display panel according to a modified example shown in FIG. 5.

FIGS. 5 and 6 show a modified example of the liquid crystal display panel 1. FIG. 5 is a plan view of a TFT substrate 110 that constitutes a liquid crystal display panel according to the modified example. FIG. 6 is a plan view of a color filter substrate 120 of the modified example. In these diagrams, a part being the same as what has been described above is given the same reference numeral. In the following, only a difference from the liquid crystal display panel 1 is described, while the others are the same as those of the liquid crystal display panel 1.

As shown in FIG. 5, in the TFT substrate 110, the sub-pixels P1, P2, P3, P4 each have a substantially V shape in a plan view. In detail, the sub-pixels P1, P2, P3, P4 each have a V-shape that is open in the extension direction of the gate electrode line 11. Therefore, a pixel electrode 118 as well has a substantially V shape in a plan view. Further, the drain electrode line 112 is bent partway such that the sub-pixels P1, P2, P3, P4 form a V-shape. In this example, a slit 118a formed in the pixel electrode 118 extends from one gate electrode line 11 to the other gate electrode line 11, being bent similar to the drain electrode line 12.

As shown in FIG. 6, the first line portion 122a of the black matrix 122 is bent in conformity with the shape of the sub-pixels P1, P2, P3, P4. That is, the first line portion 122a is formed along the drain electrode line 112, being bent partway, similar to the drain electrode line 112.

In this example, a hole 123 is formed on the fourth filter 21D. The hole 123 is formed along the first line portion 122a, being bent partway in conformity with the first line portion 122a. Therefore, the hole 123 as well has a substantially V shape.

Similar to the hole 23, the hole 123 is closer to the first line portion 122a, and the first line portion 122a serves as a part of the edge of the hole 123, that is, an edge of the hole 123 toward the first line portion 122a. In this example as well, two holes 123 are formed on the fourth filter 21D and respectively formed along two first line portions 122a positioned on the opposite sides from each other across the fourth filter 21D. The two holes 123 have the same shape. That is, the two holes 123 both have a substantially V shape. Therefore, as to the part between the two holes 123, the width of the fourth filter 21D is constant in the extension direction of the drain electrode line 112.

Note that the present invention is not limited to the above described embodiments, and various modifications are possible.

For example, although the black matrix 22, 122 is thicker than the filters 21A, 21B, 21C, 21D in the above description, the black matrix 22, 122 may be thinner than the filters 21A, 21B, 21C, 21D.

Further although two holes 12, 123 are formed on the fourth filter 21D in the above description, a larger number of holes may be formed on the fourth filter 21D.

Further, the plurality of holes formed on the fourth filter 21D may be aligned in the extension direction of the drain electrode line 12.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A liquid crystal display panel comprising a plurality of pixels and a color filter layer, wherein:

each of the plurality of pixels is divided into first to fourth sub-pixels, the color filter layer includes:

a first color filter disposed at the first sub-pixel of each of the plurality of pixels, a second color filter disposed at the second sub-pixel of each of the plurality of pixels, and a third color filter disposed at the third sub-pixel of each of the plurality of pixels, the first to third color filters being different from each other in color, and a fourth color filter which is substantially of the same color as one of the first to third color filters and disposed at the fourth sub-pixel of each of the plurality of pixels, and a black matrix partitioning the four color filters and including a first line portion which partitions the fourth color filter and a color filter adjacent to the fourth color filter, the fourth color filter has at least one hole formed thereon, the at least one hole extends in a direction along the first line portion of the black matrix, and the first line portion forms a part of an edge of the at least one hole.

2. The liquid crystal display panel according to claim 1, further comprising a substrate where gate electrode lines which receive a scan signal and drain electrode lines which receive a video signal are formed in a matrix, wherein the first line portion of the black matrix is formed along the drain electrode line.

3. The liquid crystal display panel according to claim 2, wherein the black matrix further includes a second line portion formed along the gate electrode line, and the at least one hole has an end in an extension direction of the drain electrode line, the end being positioned apart from the second line portion.

4. The liquid crystal display panel according to claim 2, wherein the fourth color filter has, as the at least one hole, a plurality of holes formed thereon positioned apart from each other in an extension direction of the gate electrode line.

5. The liquid crystal display panel according to claim 4, wherein the fourth color filter has, as the at least one hole, two holes formed thereon, the black matrix has two first line portions each serving as the first line portion and positioned on opposite sides from each other across the fourth color filter, and the two holes are respectively formed along the two first line portions.

6. The liquid crystal display panel according to claim 1, wherein the black matrix is thicker than the fourth color filter, and the color filter layer has an overcoat layer formed thereon.

7. A liquid crystal display panel comprising four sub-pixels in each pixel and a color filter layer, wherein: the color filter layer includes: a first color filter, a second color filter, and a third color filter which are different from each other in color and respectively provided at three sub-pixels of the four sub-pixels, a fourth color filter which is substantially of the same color as one of the three color filters and provided at a remaining one sub-pixel of the four sub-pixels, and a black matrix partitioning the four color filters and including a first line portion which partitions the fourth color filter and a color filter adjacent to the fourth color filter, the fourth color filter has at least one hole formed thereon, the at least one hole extends in a direction along the first line portion of the black matrix, the first line portion forms a part of an edge of the at least one hole, the liquid crystal display panel further comprises a substrate where gate electrode lines which receive a scan signal and drain electrode lines which receive a video signal are formed in a matrix, and the first line portion of the black matrix is formed along the drain electrode line wherein the four sub-pixels have a V-shape in plan view, the first line portion is bent partway into a V-shape in conformity with a shape of the remaining one sub-pixel, and the at least one hole is bent in conformity with the first line portion.

* * * * *